United States Patent [19]

Kümmel et al.

[11] 4,359,316

[45] Nov. 16, 1982

[54] SUPPLY UNIT FOR THE INDIVIDUAL SUPPLY OF DENTAL HANDPIECES

[75] Inventors: Dietmar Kümmel, Eberhardzell; Franz-Xaver Boeckh, Schönebürg, both of Fed. Rep. of Germany

[73] Assignee: Kaltenbach & Voight GmbH & Co., Biberach, Fed. Rep. of Germany

[21] Appl. No.: 207,640

[22] Filed: Nov. 17, 1980

[30] Foreign Application Priority Data

Nov. 19, 1979 [DE] Fed. Rep. of Germany ....... 2946594

[51] Int. Cl.[3] .................................................. A61C 1/14

[52] U.S. Cl. ........................................ 433/79; 433/77; 361/346

[58] Field of Search ............................. 433/77, 78, 79; 312/320, 223, 294, 312, 209; 361/346, 358, 360

[56] References Cited

U.S. PATENT DOCUMENTS

| | | | |
|---|---|---|---|
| 1,848,837 | 3/1932 | Powers | 361/346 |
| 2,227,993 | 1/1941 | Anderson | 361/346 |
| 2,789,024 | 4/1957 | Heisler | 312/320 |
| 2,856,450 | 10/1958 | Padgett et al. | 312/320 |
| 3,356,432 | 12/1967 | Stroud et al. | 312/223 |
| 4,251,211 | 2/1981 | Plowman et al. | 433/77 |

FOREIGN PATENT DOCUMENTS

| | | | |
|---|---|---|---|
| 1039116 | 9/1958 | Fed. Rep. of Germany | 361/346 |
| 2453519 | 5/1975 | Fed. Rep. of Germany | 433/78 |
| 2655201 | 2/1978 | Fed. Rep. of Germany | 433/78 |
| 2802093 | 7/1979 | Fed. Rep. of Germany | 433/77 |

*Primary Examiner*—Gene Mancene
*Assistant Examiner*—John J. Wilson
*Attorney, Agent, or Firm*—Scully, Scott, Murphy & Presser

[57] ABSTRACT

A supply unit, consisting of a plurality of adjacent arranged modular-like carriers each of which is associated with a dental handpiece, each of which has associated therewith a supply element for the individual supply of the associated handpiece, wherein the supply elements as well as the carriers are arranged adjacent each other and are provided with through conduits extending through collective supply elements and which carry the supply media for the handpieces. The conduits are connected, through connecting conduits extending within the hollow-constructed carrier, with the respective handpiece whereby, further supply components are fastened within the interior of each carrier onto a holder, and which are connected intermediate the connecting conduits leading from the associated supply element to the therewith associated handpiece. The adjoiningly arranged modular-like carriers are detachable connected with each other so as to render it possible to vary the number of the carriers as desired, to exchange one carrier with respect to another, or to service or test a carrier in a position separate from the other carriers.

5 Claims, 6 Drawing Figures

SUPPLY UNIT FOR THE INDIVIDUAL SUPPLY OF DENTAL HANDPIECES

BACKGROUND OF THE INVENTION

1. Field of the Invention

The present invention relates to a supply unit, consisting of a plurality of adjacent arranged modular-like carriers each of which is associated with a dental handpiece, each of which has associated therewith a supply element for the individual supply of the associated handpiece, wherein the supply elements as well as the carriers are arranged adjacent each other and are provided with through conduits extending through collective supply elements and which carry the supply media for the handpieces. The conduits are connected, through connecting conduits extending within the hollow-constructed carrier, with the respective handpiece whereby, further supply components are fastened within the interior of each carrier onto a holder, and which are connected intermediate the connecting conduits leading from the associated supply element to the therewith associated handpiece. The adjoiningly arranged modular-like carriers are detachable connected with each other so as to render it possible to vary the number of the carriers as desired, to exchange one carrier with respect to another, or to service or test a carrier in a position separate from the other carriers.

2. Discussion of the Prior Art

Supply units of this type have become known from German Laid-open patent applications Nos. 26 55 201 and 28 02 093. However, in these known supply units it is not possible to effect the servicing or testing of the carrier which is separated from the other carriers in the dental practitioner's offices, since the supply element of this carrier which is separated from the other carriers must be removed commonly together with this carrier and thus is no longer supplied with the supply media, such as air, water, electrical current, and so forth. The defective or the carrier which is to be tested must thus be brought to the manufacturing plant where a special servicing apparatus with connecting installation and which provides the supply media must be maintained in preparation for the connection of an individual carrier. This type of servicing and functional testing is time consuming and renders it necessary that, during this time interval, an intact exchange or reserve carrier must be built into the supply unit located in the dental practitioner's office. Independently of the hereby encountered increased costs, this necessitates a cumbersome individual supply and support arrangement in the dental practitioners offices.

SUMMARY OF THE INVENTION

Accordingly, it is an object of the present invention to provide a supply unit of the above-mentioned type in which it is possible to effect a functional testing of carrier in the dental practioner's office.

The advantages which are achieved by the present invention can essentially be seen in that after the moving out of the holder, the collective supply components such as electronic components, valves, warm water preparers, return flow pump, water jet pump for aspiration, strainers, switch, transformer are exposed, and due to the maintenance of the connection between the supply components and the supply elements by means of the sufficiently lengthy constructed supply conduits, can be supplied therethrough with the respective supply media. In this manner it is possible to test and also to service the supply components as well as the supply conduits with respect to their function, and then to also be able to effect, in particular, small repairs in the dental practitioner's office at the work site. In addition thereto, after the moving away of the holder, the supply element which is fixedly connected with the support is thus exposed and is readily accessible.

BRIEF DESCRIPTION OF THE DRAWINGS

Reference may now be had to the following detailed description of exemplary embodiments of the invention, taken in conjunction with the accompanying drawings; in which.

DETAILED DESCRIPTION

Figure 1:
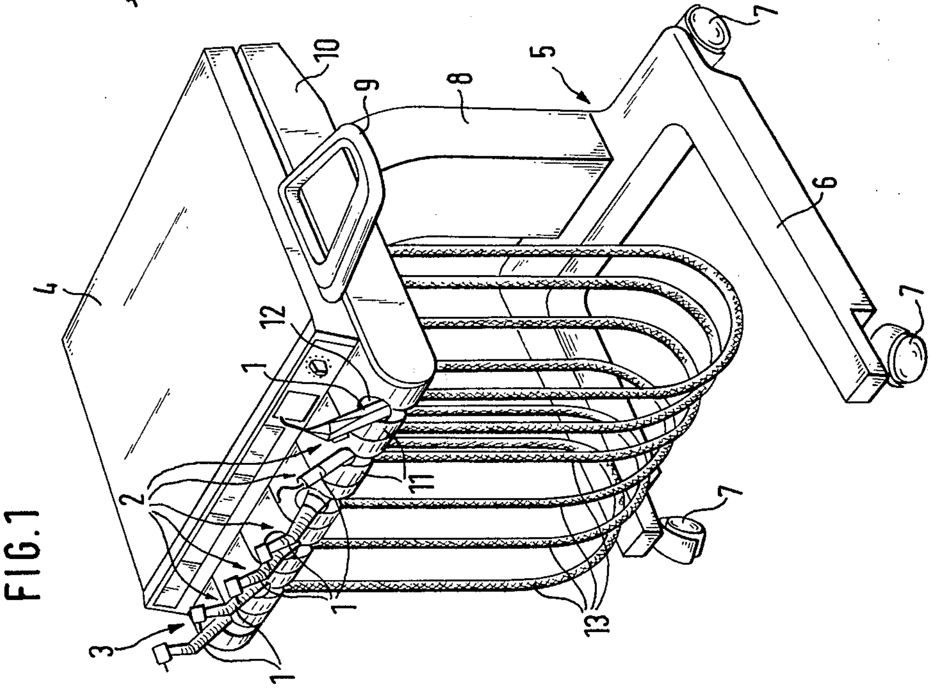
FIG. 1 illustrates in a perspective view, a supply unit arranged on a dental apparatus stand.

In the embodiment pursuant to FIG. 1, the supply unit 3 which is constituted of a plurality of adjacent arranged modular-like carriers 2 each being associated with a dental handpiece 1, is fastened to the bottom surface of a cover plate 4 of a table-like apparatus stand 5. The apparatus stand 5 possesses a rolling frame 6 with costers 7 and an upwardly extending support stand 8 by means of which there is carried the cover plate 4. The cover plate 4 includes a handgrip 9 for the movement of the apparatus stand 5. Pursuant to FIGS. 1 and 2, the supply unit 3 is also provided with cover side plates 10.

Figure 2:
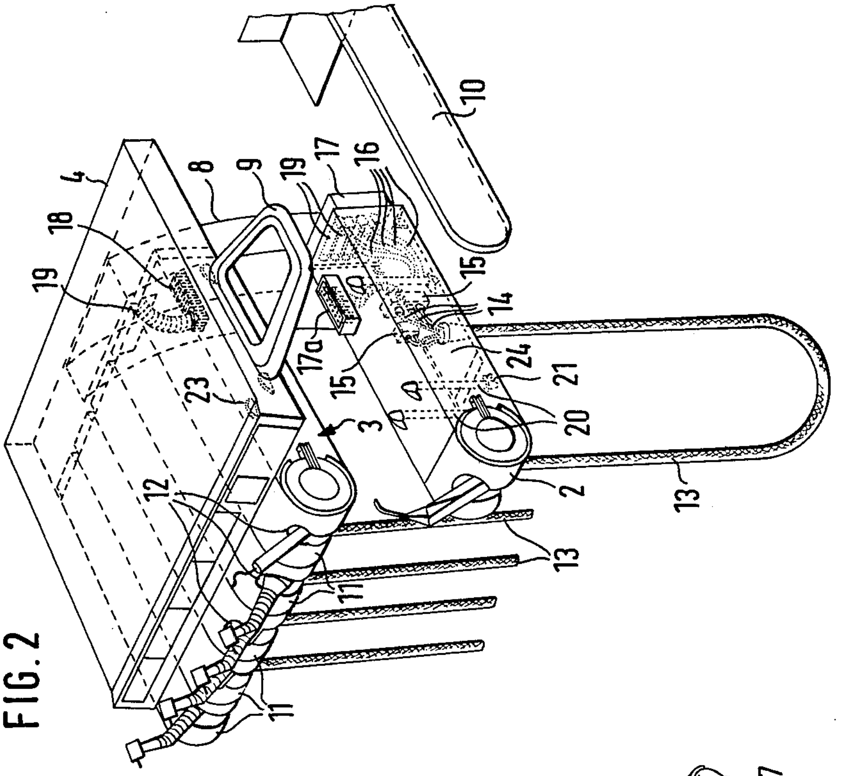
FIG. 2 shows the upper portion of the supply unit of FIG. 1 in which one carrier is separated from the other carriers of the supply unit.

Each of the equally large or almost equally large carriers 2 in accordance with the forward ends of FIGS. 1 and 2 is provided with a support 11 which is pivotable about a horizontal axis A (FIG. 3) wherein, respectively, one insert socket 12 is provided for each handpiece 1. In the inserted position, the handpiece 1 is in the inoperative position. Provided in the insert socket 12 is a pressure switch (not shown) or the like which, upon withdrawal of the handpiece 1 will control the infeed of the supply media in the context of a release, and upon the insertion of the handpiece in the context of deactuation thereof. Each handpiece 1 is connected with a supply hose 13 which leads into the carrier 2 shaped as a hollow chest-like structure.

Each supply hose 13 contains a plurality of individual conduits 14 which, at the ends remote from the handpiece, are presently connected with supply components 15 arranged in the carrier 2, for example, electronic components, valves, warm water preparers, return flow pumps, water jet pumps, strainers, switches, or the like. In accordance therewith the individual conduits 14 convey supply media such as drive or cooling air, spray water, spray air or the like, or also electrical current to the handpiece 1. In the inoperative position, the supply hose 13 hangs through downwardly. From the supply components 15 supply conduits 16 lead to a supply element which is block-like and which serves for the individual supply of the associated handpiece. Each individual conduit 14 together with the supply conduit 16 leading from the supply components 15 forms a connecting conduit which connects the handpiece 1 with the associated supply element 17.

The electrical supply conduit 16*a* which extends from an electrical supply component 15 leads to a plug-like electrical supply element 17*a* which is arranged on the upper surface of the chest-like carrier 2, which can be plugged into a socket plug 18 arranged in the bottom surface of the cover plate 4, and which leads to a power cable 19.

The supply elements 17 are fixedly connected with the respective carrier 2 and thusly, as well as the carriers 2, are themselves arranged adjacent each other.

For the inlet of the supply media, the supply elements 17 are provided with through conduits 19 which are formed as channels. The through conduits 19 of two adjacent supply elements 17 are connected with each other through connecting apertures on the supply element sides facing towards each other, which are not shown for example, of the type shown in the German Laid-open patent applications Nos. 26 55 201 and 28 02 093. Furthermore, the through conduits 19 contain connections for the supply conduits 16.

The carriers 2 including supply elements 17, 17*a* are detachably arranged in the supply unit 3. In FIG. 2 the right-hand carrier 2 is illustrated in a position separated from the supply unit 3. For the connection of the carrier 2 with the cover plate 4, the chest-shaped carrier 2 contains locking elements in the form of rotary pins 20 which traverse the carrier 2 and are vertical in the built-in position, which evidence at their lower end a turning handle 21 and at their upper end a latch 22 which is rotatable with the rotatable handle and the rotatable pin, and which engages into a locking recess 23 formed in the cover plate 4.

Figure 5:
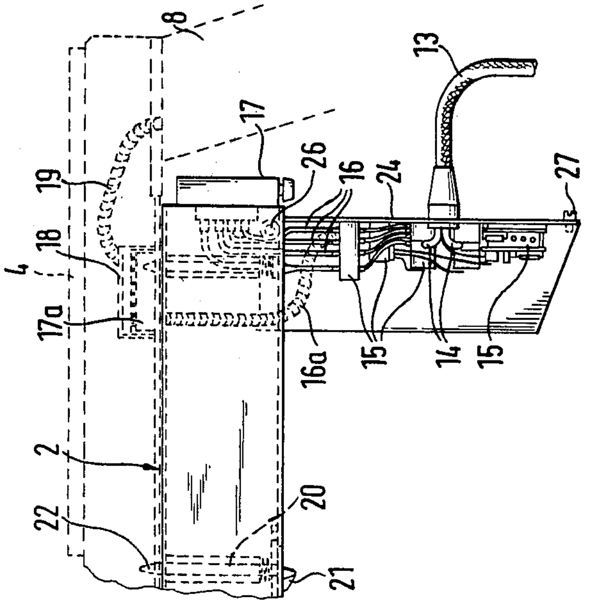
FIG. 5 shows the upper portion of the supply unit according to FIG. 3, wherein the holder of the carrier which supports the supply components is moved away from the carrier.
Figure 3:
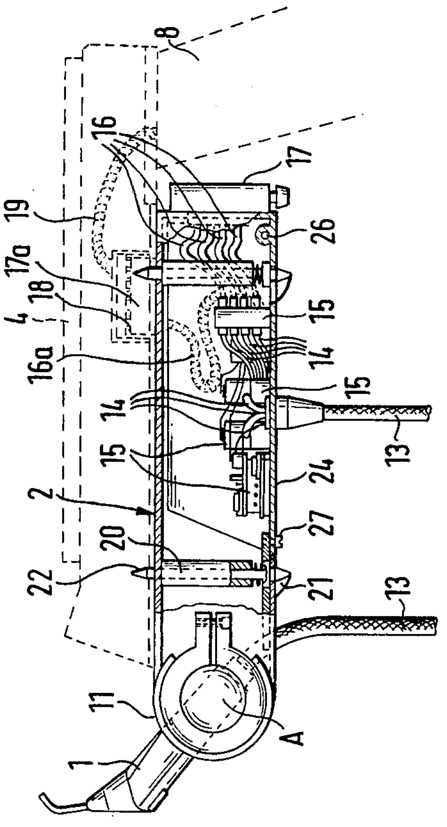
FIG. 3 shows a sectional view of the upper portion of the supply unit through a carrier.
Figure 6:
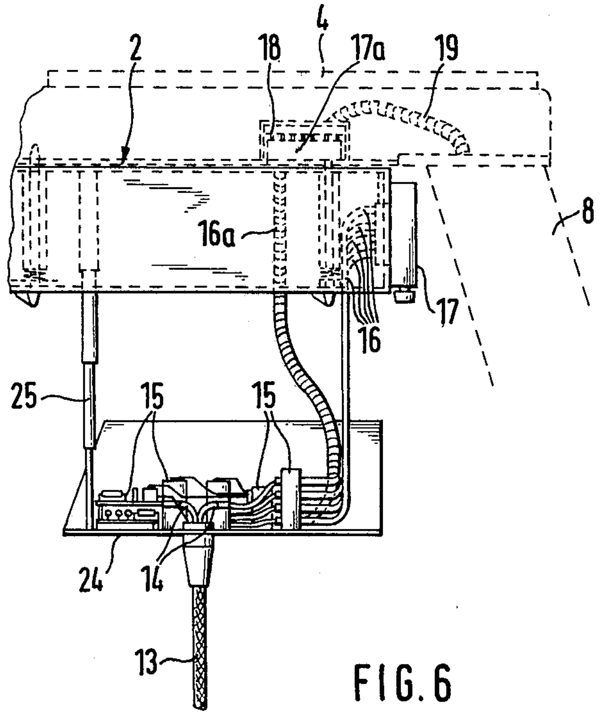
FIG. 6 is a modified embodiment with respect to that shown in FIG. 5.

The supply components 15 which are arranged in the chest-shaped carrier 2 are arranged on a holder 24 which, in the operative position shown in FIG. 3, for accessibility to the supply components 15 as well as maintaining the connection between the last-mentioned components and the supply element 17, 17*a*, in essence, with no separation of the sufficiently lengthy constructed supply conduits 16, 16*a* is pursuant to FIGS. 5 and 6 moveable away from the carrier 2.

The holder 24 can be constructed in the form of a rail or a wall section of the carrier 2. Pursuant to the drawing, the holder 24 is formed by one of the walls, in essence, the bottom wall of the chest-shaped carrier 2. Basically, the holder 24 can also be formed by a side wall or the upper wall of the carrier 2; however, the construction by the bottom wall is, on the one hand, particularly suitable in view of the sought after servicing in the practitioner's office and, on the other hand, in view of the constructive configuration of the carrier and of the supply unit.

The holder 24 can be movable away from the carrier, preferably parallel to itself, along guide 25 fastened on the carrier 2. One such guide 25 which is constructed as a telescoping rod is illustrated in FIG. 6. Suitably, the holder 24 is shown in the moved away position of FIG. 6, in essence, at an extended telescoping rod is rotatable about the axis of the telescoping rod so that the holder can be moved still further, for purposes of testing or the like, into a comfortable position.

Figure 4:
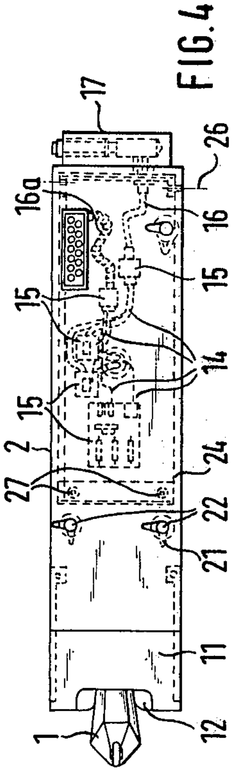
FIG. 4 is a top plan view of the carrier of FIG. 3 without the supply unit.

In the embodiment pursuant to FIGS. 3 to 5, the holder 24 so as to be pivotable downwardly away from the carrier about an axis 26 arranged along the one holder, and which is supported on the carrier 2. FIG. 5 illustrates the holder 24 in the outwardly pivoted position, which also affords a comfortable position for testing purposes or the like.

The holder 24 has arresting means 27 associated therewith for arresting in its inserted position, in effect, in its operative position, which pursuant to FIGS. 3 to 5 can be constituted of at least one from externally manipulable screw arranged on the holder 24 and of at least one threaded aperture on the carrier 2 for the engagement of the screw. The arresting means 27 can also be formed by a snap closure or the like. Similar arresting means can be provided for the moved away position, in essence, for the testing or servicing position of the holder 24.

What is claimed is:

1. In a supply unit having a plurality of adjacent arranged modular hollow carriers each associated with a dental handpiece; a supply element associated with each said carrier for the individual supply of each handpiece, said supply elements being located adjacent each other; through conduits extending through the collective supply elements and conveying supply media for said handpieces; connecting conduits extending across said carriers and connecting said through conduits with respective handpieces; a holder in each said carrier; and supply components fastened interiorly of each carrier to respectively one said holder, said supply components being connected into the associated supply conduits leading to an associated handpiece, the improvement comprising: said holder supporting the supply components is formed by a bottom wall section of a chest shaped hollow carrier said holder being downwardly pivotable from its operating position so as to render accessible the supply components fastened thereto as well as maintaining the connection between said components and the supply element in the hollow carrier, and said holder being pivotable about an axis located in proximity to the rear wall, whereby the support for the dental handpiece is constructed so as to remain stationary in the carrier.

2. Supply unit as claimed in claim 1, comprising a holder downwardly movable away from said carrier, along a perpendicular guide fastened on said carrier.

3. Supply unit as claimed in claim 2, said guide being formed by at least one telescoping rod.

4. Supply unit according to claim 3, comprising a holder having a single telescoping rod, said holder being pivotable to a drop down position about said rod.

5. Supply unit as claimed in claim 1, said holder comprising locking means for latching said holder at least in the operative position thereof.

* * * * *